United States Patent [19]

Steinitz

[11] 4,206,439
[45] Jun. 3, 1980

[54] ALERTING SYSTEM AND ARMING/DISARMING APPARATUS THEREFOR

[76] Inventor: Donald J. Steinitz, 15040 Parthenia #51, Sepulveda, Calif. 91343

[21] Appl. No.: 867,274

[22] Filed: Jan. 5, 1978

[51] Int. Cl.$^2$ ............................................. B60R 25/10
[52] U.S. Cl. ................................ 340/63; 307/10 AT; 180/287
[58] Field of Search .......................... 340/63, 64, 65; 307/10 AT; 180/114

[56] References Cited
U.S. PATENT DOCUMENTS 3,569,928   3/1971   Avallone ................................. 340/63

Primary Examiner—Alvin H. Waring
Attorney, Agent, or Firm—Frank L. Zugelter

[57] ABSTRACT

An alarm device which eliminates the possibility of totally disarming its alarm by a thief. In one embodiment, a magnet is swiped by a reed switch a predetermined number of times to set the device in an armed condition. With each swipe, a stepper arm in the electrical circuitry moves from one contact to the next, until in a contact position, known only to the authorized user, that sets the device in such armed condition. Should any current be drained off from the electrical source (battery) to energize any car electrical circuit (light bulb, say), current is also then made available to the armed device through the stepper arm contact, the alarm of the device thereby being activated. A simpler embodiment includes a mechanical latching relay DPST switch which is normally open, but is closed upon a magnet passed over a first reed switch to arm the device. The magnet is passed over a second reed switch to open such relay switch, disarming the device.

29 Claims, 3 Drawing Figures

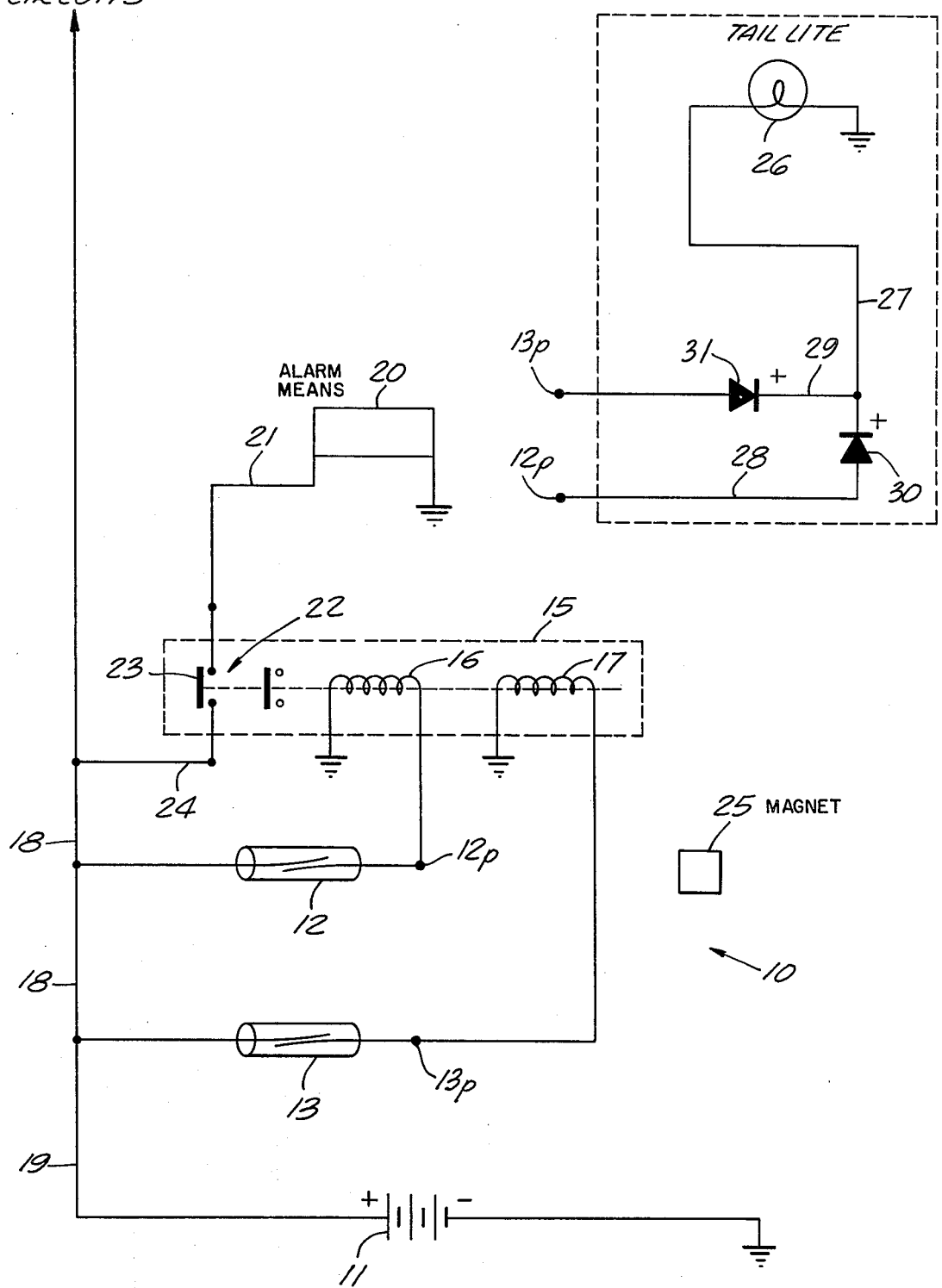

ALERTING SYSTEM AND ARMING/DISARMING APPARATUS THEREFOR

This invention relates generally to alerting systems, and in particular to an arming and disarming apparatus for an alerting system adaptable for anti-theft purposes.

Although the invention is adaptable in various other fields of use, it was conceived and utilized initially as an alarm system to prevent theft of an automobile. The invention will be discussed, therefore, in light of its utility in an automobile; however, it should be understood that its utilization is not limited to that particular field of use.

It is common knowledge that great quantities of vehicles, particularly passenger automobiles, are stolen nationwide during a year's period of time. Aside from police authorities' efforts to deal with this crime, various devices have been installed in automobiles by or on behalf of their owners or proper users as means to thwart any attempt to steal them. Some cars include such devices as part of the originally-equipped manufacturer's vehicle. In any instance of the use of these devices, however, a thief has been able to defeat the utility of such devices, by, for example, cutting the wiring of such a device to totally deactivate it before ever attempting to initiate movement of the car. Also, some anti-theft devices are operatively connected to a door key-lock or ignition switch, and it is a simple matter by experienced thieves to circumvent the effect of these devices in their armed state, and thus, to make off with the car.

One of the greatest disadvantages of systems presently used on cars is the fact of awareness by the thief that the car he is going to steal employs an anti-theft system about which he has specific knowledge. And with this information, he is able to side-step the desired effect of the system, by in some way disarming it. In this invention, should the thief attempt to disarm the alarm, after it has sounded, by any of his known methods, unless he can find a hidden closed switch in a by-pass circuit to open, the alarm continues to sound. It will be seen from this disclosure that the system of the present invention resolves the difficulties and disadvantages indicated above while obtaining features and advantages heretofore not known or obtainable.

SUMMARY

An object of this invention is to provide a novel, sure-proof alerting system, and a novel arming/disarming apparatus therefor.

Another object of this invention is to provide such a system which is readily and easily installed or mounted into its medium (here, a motorized vehicle), with a minimum degree of effort, skill and work, even by a person unknowledgeable in the electronic arts.

A further object of this invention is to provide a reliably-operated anti-theft system, one in which only the proper user knows is either in an armed or unarmed state, without the thief being able to determine either state, though he may think he has.

Another object of this invention is to eliminate any possibility of a thief totally disarming the system.

These and other advantages and objects of the invention will become more apparent by a reading of the following description and appended claims thereto, while taking the drawing comprising two sheets of three FIGURES into consideration therewith.

BRIEF DESCRIPTION OF THE DRAWING

FIG. 1 is a schematic diagram of an embodiment of the invention.

FIG. 2 is a fragmentary view of a feature of the invention which is readily utilizeable with the embodiment shown in FIG. 1.

DESCRIPTION OF THE PREFERRED EMBODIMENT

Figure 3:
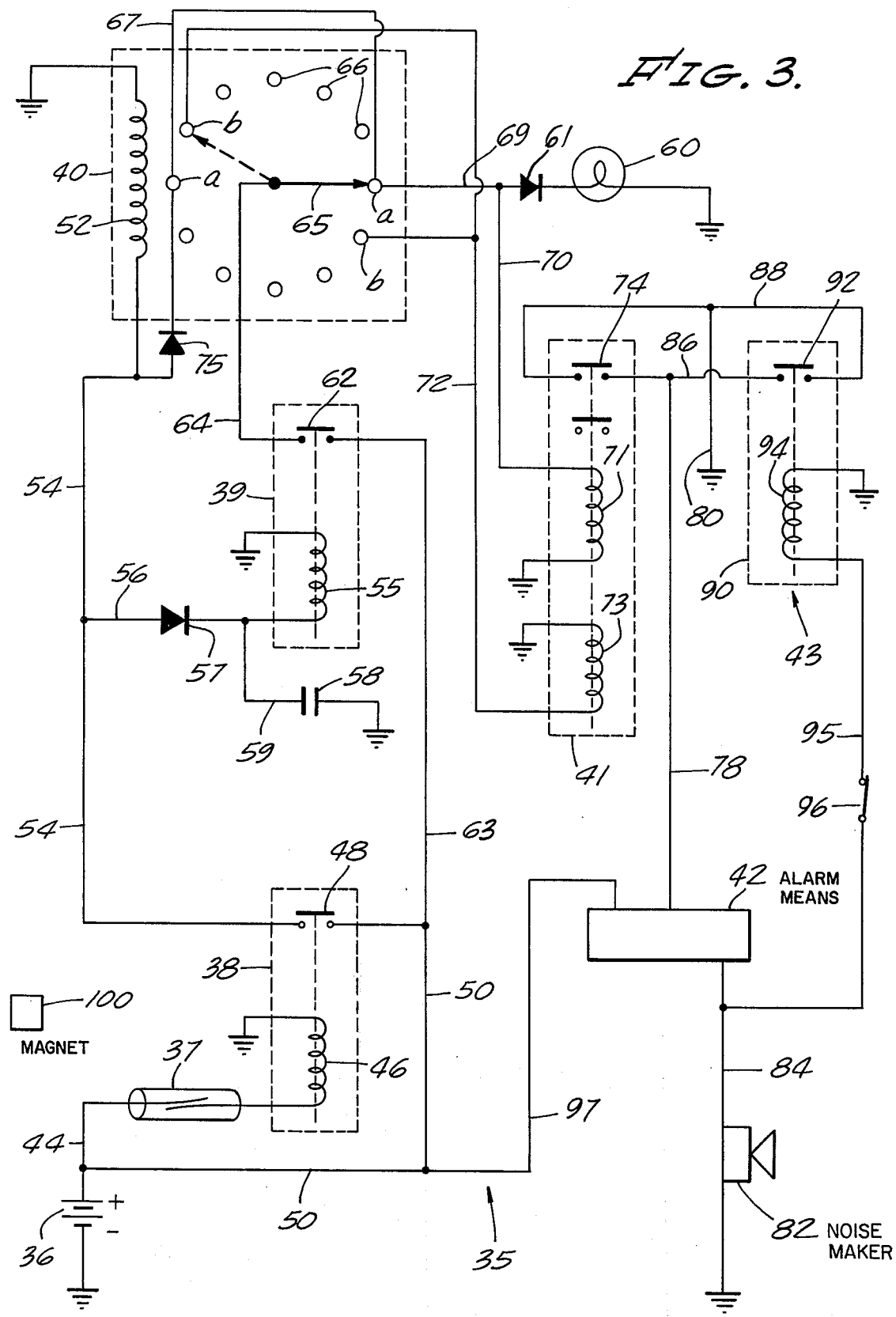
FIG. 3 is a schematic diagram of another embodiment of the invention, showing some features of the invention which may not necessarily be incorporated in every copy of the invention but may be eliminated if desired without affecting its utility.

Referring now to the drawing in which reference characters correspond to like numerals hereinafter in this specification, FIG. 1 illustrates one embodiment of the invention in an alarm system 10. The system or circuitry means 10 is to be utilized with a (grounded) source 11 of voltage and/or current, such as the kind of storage battery utilized in an automobile or other vehicle, and comprises reed switches 12, 13, and electronic switching means 15 such as a double-pole single-throw (DPST) mechanical latching relay unit having its one (grounded) coil 16 operatively connected to one side of reed switch 12 and its other (grounded) coil 17 operatively connected to one side of reed switch 13. The other respective sides of the reed switches 12, 13 are operatively connected to the source 11 by means of conductors 18, 19, respectively. An alerting or alarm means 20 is operatively connected via a conductor 21 to one contact of an electromechanical latch or switch 22 of the relay unit 15. The relay unit 15 includes, of course, a contact arm 23 on its armature and which is normally in open position. The contact arm 23 provides the electrical connection to the other contact of the latch or switch 22, and which other contact is operatively connected by a conductor 24, to the conductor 18. The switch or relay 22 is of the mechanical latching type, well-known in the art, and in which, here, the armature is mechanically latched to maintain contact arm 23 closed in the event the coil 16 is energized and is unlatched to return contact arm 23 to its normally open position in the event the coil 17 is energized.

The reed switches 12, 13 are of the kind disclosed in FIG. 3 of U.S. Pat. No. 4,034,337. When a magnet 25 is passed but once by or over either reed switch 12, 13, the respective normally open contacts thereof are momentarily closed as a result of the magnetic force acting thereon and developed within the magnetic field surrounding the magnet 25 that is placed in proximity to either of the reed switches 12, 13 in the initial and end steps of operation of the invention.

Two modes of operation are established for the alarm means 20 after the magnet 25 is passed but once in proximity to reed switch 12. The first mode is one of arming and the second is one of actuation. With such single passage of magnet 25 by or over reed switch 12, the contacts of the latter momentarily close, to thereby momentarily impress a voltage drop across the coil 16 of relay unit 15. The latch 22 is thus caused to close, i.e., contact arm 23 closes to operatively connect together conductors 21 and 24. A flowpath (1) is established, viz.: source 11, conductors 18, 24, switch 22, conductor 21, alarm means 20, to ground, and ground return to source 11. The alarm means 20 is now armed.

In the event now that current is drained or drawn from the source 11 through the conductor 18, the second mode, that of actuation, occurs because current will pass into conductor 18 and through flowpath (1). Alarm means 20 thus emits its audio sound or gives out other sensing indication that such a demand on current has been made.

It should be evident now that in the event the aforesaid described invention is adapted for use in a transporting vehicle or portable device mounted on such a vehicle, or otherwise, and which requires consumption of electrical energy, the utility of this embodiment functions as the vehicle's or device's anti-theft or alarm purpose. Should an unauthorized person, say, open one of a vehicle's doors causing a roof overhead or dashboard light to come on, or to turn on an ignition switch for a vehicle's motor, or for operation of any electrical appliance, or for any other reason causing a demand for current to be generated from the source 11 through the conductor 18, such action activates the armed means 20, and alerts others to the alarm (alert) signal and/or attempted theft.

A commercial example of an alerting or alarm means 20 which becomes armed first and actuated only by a subsequent drain on current is described below as element 42 in the reference to the embodiment illustrated in FIG. 3.

To completely disarm system 10 so that an authorized person may obtain a demand for current through any other electrical systems to which system 10 is connected, without activating the armed alarm means 20, such person merely passes the magnet 25 but once by or over the reed switch 13. The contacts of reed switch 13 momentarily close, thereby impressing momentarily a voltage drop across the coil 17 of the relay unit 15. The latch 22 is mechanically unlatched thereby. This action in and the double-pole single-throw latching relay device itself are well known in the state of the art. The contact arm 23 opens, and thus, no current can flow to conductor 21. Any demand for current through the conductor 18 from the source 11 does not actuate the means 20.

Another feature which may be incorporated into this embodiment is shown in FIG. 2. A grounded signal means 26, such as an incandescent lamp, is provided whereby visual observation of its activation (lighting-up) by the user indicates that the system 10 is either armed or unarmed when the magnet 25 is passed but once by switches 12, 13, respectively. This indication is achieved by operatively connecting the signal means 26 to points between the respective connections of the reed switches 12, 13, to their respective coils 16, 17 in relay unit 15. FIG. 2 illustrates such an operative connection. A conductor 27 from the grounded signal means 26 is attached to lines 28, 29 which are in turn attached to respective points 12p, 13p in the connections between the reed switches 12, 13 and their respective coils 16, 17. Silicon diodes 30, 31 are inserted in lines 28, 29, respectively, as shown, to prevent return of voltage to either coil 16, 17 and which would effect closing and opening of the latch 22.

Thus, upon closing of either reed switch 12, 13, the signal means 26 momentarily lights up. Means 26 need not, of course, be limited only to an incandescent lamp. Should means 26 constitute a vehicle's head-light, rear-light, etc., its momentary light-up assures the user by observing it that passing of the magnet 25 has indeed momentarily closed the reed switch 12, 13 and effected arming or disarming as the case may be.

The embodiments illustrated in FIGS. 1 and 2 as adapted to an automobile or the like, should not include the positioning of the reed switches 12, 13 in adjacency to metallic portions thereof, but rather in immediate adjacency to plastic or other non-metallic portions thereof; preferably hidden, of course.

FIG. 3 illustrates another embodiment 35 of the invention. The embodiment or system 35 is to be utilized with a (grounded) source 36 of voltage and/or current, and comprises switch means such as a reed switch 37; a pair of single-pole single-throw (SPST) relay units 38, 39; a relay mechanism 40; and an electronic switching means 41 such as a double-pole single-throw (DPST) latching relay unit. As will be described, these elements are combined or coupled to an alerting or alarm means or module 42, and to an additional feature of the invention as illustrated by a by-pass switch circuit means 43.

The reed switch 37 is operatively connected on its one side by a conductor 44 to a general electrical line connected to or is otherwise directly attached to the voltage/current source 36, and on its other side to a grounded coil 46 of relay unit 38. A contact arm 48 on the armature of unit 38 is in normally open position (as shown) relative to its cooperating switch that has one of its contacts operatively connected to the source 36 via a conductor 50 attached to conductor 44 or the source 36. The other contact of the cooperating switch in relay unit 38 is operatively connected to a grounded coil 52 in the relay mechanism or stepper 40 by means of a conductor 54.

The relay unit 39, preferably of a type with which a time-delay element of operation is afforded, includes a grounded coil 55 operatively connected to the relay unit 38 by means of a conductor 56 being attached to conductor 54. In this embodiment, a silicon diode 57 in included in the line 56 to the relay unit 39, to prevent return discharge of current in a grounded capacitor 58 in a circuit 59 attached to the line 56 between the diode 57 and the coil 55. The action of the capacitor 58 provides for a time-holding of energization of the coil 55, the effect of which, under a certain condition hereinafter described for the stepper 40, is to supply a voltage to a coil 71 in the electronic switching means 41. Also, a signal means 60 is activated for a like period of time. The purpose of means 60 is to provide a visual perception to the user that the system or apparatus 35 is armed. Such visual perception is also available to the user with omission of the capacitor 58 and its circuit, but only for a moment's duration as distinguished from a definite period of time, and which to some users may not be observable. It may also be desired not to include the signal means 60 at all. In the event means 60 is used, however, a silicon diode 61 in its line prevents return of any voltage across means 60 to the coil 71 and the stepper 40.

The relay unit 39 also includes a normally open contact arm 62 (as shown) on its armature and which cooperates with the unit's switch or latch. The one contact of such switch is operatively connected to the source 36, here, by means of a conductor 63 being attached to conductor 50. The other contact of the switch is operatively connected via a conductor 64 to an arm 65 capable of advancing in a step-by-step manner and provided in and as part of the relay mechanism 40.

The relay mechanism 40 includes a plurality of contact means or pins 66 with each one of which the arm 64 advances or rotates to make independent engagement with each of such means 66 as it is caused to advance or rotate during its functioning. For illustrative purposes only, a set a of pins 66 is wired as at 67 and also is wired via a conductor 69 to the signal means 60 and wired via a line 70 to the grounded coil 71 in the electronic switching means 41. Further, a set b of pins 66 is wired via a conductor 72 to another grounded coil 73 of the unit 41. In the instant embodiment each set a, b comprises only two pins; however, it will become evident and clearly understood hereinafter that each of these sets a, b is not limited to a particular number of pins 66. Here, in this embodiment of FIG. 3, a good utilization of the relay mechanism 40 involves the use of two pins in each set a, b.

An additional line including a diode 75 is operatively connected between the conductor 54 attached to the positive side of the coil 52 in the mechanism 40 and a pin a. The diode 75 prevents return of any voltage impulse from a pin a to the coil 52 which would otherwise undesirably advance at least a step, and also prevents return of such impulse along line 54.

The electronic switching means 41 includes a normally open contact arm 74 (as shown) with its armature, and which cooperatively acts upon the unit's relay switch or latch, one contact of which is operatively connected to the grounded alarm module 42 by means of a conductor 78, while its other contact is caused to be grounded via a conductor 80. Illustratively, a grounded noisemaker 82 is operatively connected to the alarm module 42 via a conductor 84; however, it should be understood that the mechanism 82 may be an integral component of the module 42 itself.

The by-pass switch circuit means 43 is operatively connected across the conductors 78, 80 by means of conductors 86, 88, respectively. The means 43 includes a single-pole single-throw relay unit 90 having a normally open contact arm 92 (as shown) with its armature and which cooperatively acts upon the unit's relay switch or latch. Such switch or latch has its one contact attached to the conductor 86 while its other contact is attached to the conductor 88. This relay unit 90 includes a grounded coil 94 operatively connected to the noisemaker 82 by means of a condcutor 95. A manually-operable normally closed (N.C.) switch 96 is provided in the conductor 95 between the alarm means 42 or noisemaker 82 and relay unit 90.

Alarm means or module 42 is operatively connected to the source 36 by means of a conductor 97 being attached to conductor 50. And it may be observed from FIG. 3 that electrical power from the source 36 is always available to one side of the alarm means or module 42, and to one side of each of the relay units 38, 39 even though the system or device 35 has not yet been armed.

The above-described embodiment of the invention may be readily assembled by combining the following identified components, all available in today's marketplace, in the fashion and arrangement exemplified in FIG. 3.

| Element | Ref. Ch. | Marketplace Component |
|---|---|---|
| conductors and lines | | common variety |
| magnet | 100 | common variety |
| reed switch | 37 | magnetic |
| diodes | 57,61,75 | 3 amps., 1000 PIV |
| capacitor | 58 | 1000 μ fd. at 16 V., D.C. |

| Element | Ref. Ch. | Marketplace Component |
|---|---|---|
| relay units | 38,39 | 12 V., D.C., SPDT, 3 amps. contact rating |
| relay unit | 90 | 12 V., D.C., SPDT, sensitive relay, 5000 ohm coil, ½ amp. or higher contact rating |
| switch | 96 | toggle, SPDT |
| latching relay | 41 | SPDT, 12 V., D.C. |
| relay mechanism | 40 | 1 pole, 12 position stepper, 12 V., D.C., mfgd. by Guardian Electric Manufacturing Co., 1550 West Carroll Ave., Chicago, Ill. 60607, Model #Series 705 Rotomite Stepper |

A commercial example of an alarm means or module 42, with the noisemaker 82 as an integral part thereof, is Model #VL-7, also known as a Vibra-larm, manufactured and sold by the Adalarm Company, 432 N. Tustin Ave., Orange, California 92669.

Current sensing alarm modules, with a noisemaker separate or integral therewith, are also adaptable, however, it is best that a current sensitivity adjustment feature be included in such a sensing device, to eliminate inconvenient movement of the alarm module towards or away from the voltage source. An example of such a current sensing device is a CALRAD model, part #95-891, an alarm system for autos and boats, sold by Calrad Imports, 819 N. Highland Ave., Los Angeles, CA.

The operational modes of arming and disarming will now be described. The mode of arming the alerting or alarm means or module 42 involves the passing of a magnet 100 a necessary number of times by or over the reed switch 37. Each such passing impresses a voltage drop or impulse across certain elements in flowpaths that are established as follows: ($p_1$) comprising source 36, line 44, reed switch 37, coil 46, and thence to ground. The contact arm 48 thus is momentarily closed across its cooperating switch. Voltage is also momentarily impressed across the coil 55 of the relay unit 39 through a flowpath ($p_2$), and across the coil 52 of the stepper relay mechanism 40 through a flowpath ($p_3$). Flowpath ($p_2$) comprises: source 36, line 50, contact arm 48 across its cooperating switch, lines 54 and 56, coil 55, and thence to ground. Flowpath ($p_3$) comprises: source 36, line 50, contact arm 48 across its cooperating switch, line 54, coil 52 in stepper 40, and thence to ground.

As the result of impressed voltage across the coil 55 in the relay unit 39 via flowpath ($p_2$), its contact arm 62 is closed, to thereby establish a flowpath ($p_4$) to the stepper arm 65 as follows: source 36, lines 50 and 63, contact arm 62 across its cooperating switch, and line 64 to the stepper arm 65.

The flowpath ($p_4$) continues to the grounded coil 71 of the latching relay unit 41 only on the certain condition or in the event that the stepper arm 65 makes contact with any pin a. When such contact with a pin a occurs, the flowpath ($p_4$) continues through the stepper arm 65, the pin a, through lines 69 and 70, to the coil 71 and thence to ground. In such case, the voltage momentarily impressed across the coil 71 causes the contact arm 74 to mechanically latch across its cooperating switch. A voltage drop now occurs across the alarm means or module 42, which is thereby armed.

With this certain condition existing, signal means 60 is activated for a period of time, say, for example, five seconds, as a result of the circuit containing capacitor 58, to thereby provide the user his visual perception thereof that the system is now armed. To avoid voltage returning from the signal means 60 to the coil 71 or to the stepper relay 40, the diode 61 is inserted in the line of the signal means 60.

Actuation of the signal means 60 also informs a knowledgeable user that the stepper arm 65 is in a position engaging a pin a (hereinafter denoted as an arming pin) and that the flowpath (p4) continues through the arming pin a, line 69, etc., to the alarm means 42. However, the owner or proper user of the system also knows the total number of pins 66 in the stepper relay 40 and also the position of a pin b (hereinafter denoted as a disarming pin) which correlates to or cooperates with the arming pin a from which the stopper arm 65 advances to such disarming pin b. Thus, the system or apparatus 35 can be purposefully disarmed by the owner or proper user thereof, by passing a magnet 100 by the reed switch 37 a known number of times so that the stepper arm 65 advances the same number of steps to the corresponding disarming pin b. In the illustrated embodiment of FIG. 3, the magnet 100 is passed by the reed switch 37 five times, so that arm 65 advances in a counter-clockwise motion to engage disarming pin b, as shown in dash lines. Upon engagement of the arm 65 with the disarming pin b, a voltage drop is impressed across the coil 73 of the electronic switching means or mechanical relay latching unit 41, via the conductor 72 connecting such coil 73 to the disarming pin b. As a result, the contact arm 74 in the unit 41 is opened, thereby disarming the alarm means or module 42.

Failure to make the correct amount of passes by the reed switch 37 will result in a corresponding failure to disarm the alarm system. Any position of engagement between the stepper arm 65 and a pin 66 other than an arming pin a or disarming pin b does not disarm the system after the stepper arm 65 once engages an arming pin a. It should be noted that in the instance embodiment, an arming pin a follows immediately adjacent to a disarming pin b, so that the owner or proper user is required merely to pass the magnet 100 once by the reed switch 37 to arm the system, and, known only to themselves, to pass the magnet 100 a particular number of times passed the reed switch 37 to disarm the system.

It may be noted that a voltage impulse to coil 71 in the relay unit 41 and to the signal means 60 occurs with each advance of the stepper arm 65 to a pin 66 not either pin a or pin b. With each magnet swipe across the reed switch 37, flowpath (p3) is established to cause such advance of the arm 65, and a flowpath (p5) is also established as follows: flowpath (p3) to the extent of conductor 54, thence through diode 75, pin a, line 67 (where more than one pin a is to be included in the relay mechanism 40), and line 69, and thence to signal means 60 and to the coil 71 of relay unit 41. However, no change in the relay unit 41 occurs, as the coil 71 merely "sees" the impulse and in no way does such impulse affect the latched closed position of the contact arm 74 in the unit 41.

While the apparatus 35 is in an armed state, the alarm module 42, in the form of vibration model VL-7 noted above, may experience a vibration as a result of movement of, say, a vehicle to which it is coupled. In which case, the alarm sounds. It is within the nature of the characteristics of this type of module, available today in the marketplace, to include an internal switch which is closed by a vibration to thereby connect voltage to the noisemaker 82. Other types of modules may also be utilized.

To disarm the system 35 after its arming but before the alarm sounds, one must swipe the magnet 100 by the reed switch 37 a known number of times so that the stepper arm 64 advances to a disarming pin b. Advancement to any other pin 66 does not disarm the system. Each magnet swipe by the reed switch 37 develops a voltage impulse across the coil 52 of the stepper 40, via flowpath (p3); the arm 65 advances one pin per swipe. Upon the arm 65 engaging a pin b, a voltage impulse occurs across the coil 73 of the relay unit 41, via flowpath (p4) to and through the arm 65, pin b and conductor 72. The coil 73 is energized to unlatch the closed contact arm 74 in relay unit 41 and thereby disarm the alarm module or means 42.

In the event the alarm sounds during the armed state of the module or means 42, the by-pass circuit means 43 provides for continued sounding of the alarm even though a thief is able by chance to cause the stepper arm 65 to engage a disarming pin b, or by severing of the circuitry of system 35 (not including the circuitry of means 43), or by other way, for the following reason. The sound frequencies emanating from the noisemaker 82 induce a voltage impulse across the coil 94 in the relay unit 43, to thereby close its contact arm 92 and thereby establish a flowpath (p6) as follows: ground, noisemaker 82, conductor 84, alarm module 42, conductors 78 and 86, the switch including contact arm 92, conductors 88 and 80, and thence again to ground. And until the normally closed switch 96 is opened, the alarm continues to sound. A thief would not only have to be aware of the existence and installation of the by-pass circuit means 43, but also know of the exact location of the switch 96 inside a vehicle in order to open such switch. Should the owner or proper user is some manner, accidentally or otherwise cause the alarm means to sound off before disarming the system by use of the magnet 100 with the reed switch 37, such user may quickly gain access to the interior of the vehicle, and open the switch 96.

Other than noisemakers 82 may be utilized with module 42, such as a camera, or a bright light, or the like, suitably triggered after the apparatus is in an armed state. Also, the invention has utility in a comparable and equivalent solid state form in the electronic arts.

While the invention has been described and illustrated by the embodiments shown, it is not intended to be strictly limited thereto, and other variations and modifications may be employed within the scope of the following claims.

Therefore, I claim:

1. An apparatus for delivery of voltage to arm and disarm an alerting or alarm means and comprising
   a latching relay having a pair of grounded coils and a switch therein having one of its two contacts adapted for operative connection to the alerting or alarm means,
   a first switch means having a pair of contacts one of which is operatively connected to the first of said coils,
   a second switch means having a pair of contacts one of which is operatively connected to the second of said coils, and operative connections attached to the others of the respective contacts of said first and second switch means and to the other contact of said switch in said relay for operative connection to a voltage source, whereby a voltage impulse impressed upon the first of said coils through such operative connections and through the closing of the contacts of said first switch means mechanically latches said switch in said relay to thereby cause arming of said alerting or alarm means, and a voltage impulse impressed upon the second of said coils through such operative connections and through the closing of the contacts of said second switch means unlatches said switch in said relay to thereby cause disarming of the alerting or alarm means.

2. The apparatus of claim 1 including the voltage source to which said operative connections are attached, said source delivering voltage for so arming and disarming said alerting or alarm means.

3. The apparatus of claim 2 in combination with a magnet for closing either of said first or second switch means.

4. The apparatus of claim 1 in combination with a magnet for closing either of said first or second switch means.

5. The apparatus of claim 1 including a signal means for perceiving the arming of the alerting or alarm means, said signal means including a conductor operatively connecting it to the side of said first of said coils opposite its grounded side, and a means in said conductor for preventing a voltage return from said signal means to said first of said coils.

6. The apparatus of claim 5 in combination with a second conductor operatively connecting said signal means to the side of said second of said coils opposite its grounded side to thereby constitute said signal means also as a means for perceiving the disarming of the alerting or alarm means, and a means in said second conductor for preventing a voltage return from said signal means to said second of said coils.

7. The apparatus of claim 1 including a signal means for perceiving the disarming of the alerting or alarm means, said signal means including a conductor operatively connecting it to the side of said second of said coils opposite its grounded side, and a means in said conductor for preventing a voltage return from said signal means to said second of said coils.

8. In an arming and disarming apparatus for an alerting or alarm means and including a pair of switch means which arm and disarm, respectively, the alerting or alarm means, the improvement comprising an electronic switching means for controlling the arming and disarming of the apparatus in combination with said pair of switch means, said electronic switching means including a normally-open switch and a pair of coils the first of which upon a voltage drop thereacross closes and latches closed said normally-open switch and the second coil of which upon a voltage drop thereacross opening the latched-closed switch, the first of said pair of switch means being operatively connected on its one side to the first of said pair of coils, and the second of said pair of switch means on its one side being operatively connected to the second of said pair of coils, the other sides of said pair of switch means and electronic switching means being adapted for operative connection to a source of voltage.

9. The improvement of claim 8 in combination with a magnet for closing each of said pair of switch means so as to provide the voltage drop across their corresponding coil whereby said normally-open switch correspondingly latches closed and opens.

10. The improvement of claim 9 wherein said electronic switching means is a latching relay unit.

11. The improvement of claim 10 in combination with an alerting or alarm means, said alerting or alarm means being armed by the latching closed of said normally-opened switch.

12. The improvement of claim 8 wherein said electronic switching means is a latching relay unit.

13. The improvement of claim 12 in combination with an alerting or alarm means, said alerting or alarm means being armed by the latching closed of said normally-opened switch.

14. The improvement of claim 8 in combination with an alerting or alarm means, said alerting or alarm means being armed by the latching closed of said normally-opened switch.

15. The improvement of claim 14 in combination with a magnet for closing each of said pair of switch means so as to provide the voltage drop across their corresponding coils whereby said normally-open switch correspondingly latches closed and open.

16. An apparatus for arming and disarming an energized alerting means and comprising in combination, an electronic switching means for operative connection to and through which the alerting means is armed or disarmed, a relay mechanism operatively connected to said electronic switching means and including
  (a) at least two contact means making such operative conections with said electronic switching means,
  (b) an arm advanceable in a step-by-step manner to engage each of such contact means which are not necessarily in successive step positions, and
  (c) a coil, a voltage drop across which causes said arm to advance a step, a pair of relay means each including an open switch and a grounded coil, a voltage drop across each such grounded coil causing its corresponding open switch to close, the first of said relay means having its open switch operatively connected to said arm, the second of said relay means having its open switch operatively connected to the coil of the first of said relay means, said open switches in said relay means also being adapted for operative connections to a source of voltage, and switch means operatively connected to the coil of the second of said relay means and adapted for operative connection to the source of voltage, the closing of said switch means which has been operatively connected to the source of voltage causing voltage drops across the coils of said first and second relay means and thus across said relay mechanism's coil, thereby causing said arm to advance a step in its engagement with any one of said contact means, said electronic switching means closing to arm the alerting means in the event said arm engages not any one but one of said contact means which constitutes one of a first set of contact means operatively connected with said electronic switching means, said electronic switching means opening to disarm said alerting means in the event said arm engages not any one but another one of said contact means which constitutes one of a second set of contact means also operatively connected with said electronic switching means.

17. The apparatus of claim 16 in combination with the alerting means, said alerting means being operatively connected to said electronic switching means.

18. The apparatus of claim 17 in which said alerting means in an alarm device.

19. The apparatus of claim 16 including a signal means for perceiving operation of said apparatus, said signal means operatively connected to said one of a first set of contact means in said relay mechanism, and means in the operative connection between said signal means and said one of a first set of contact means for preventing a voltage return to the said coil in said relay mechanism and to said electronic switching means.

20. The apparatus of claim 19 including a capacitor circuit coupled to the grounded coil of said first of said relay means, whereby said signal means is caused to be actuated for a definite period of time, and means in the operative connection between said grounded coil of said first of said relay means and the open switch in said second of said relay units for preventing discharge from said capacitor circuit and which would impress a voltage drop across said coil in said relay mechanism.

21. The apparatus of claim 19 in combination with the alerting means, said alerting means being operatively connected to said electronic switching means.

22. The apparatus of claim 21 in which said alerting means is an alarm device.

23. The apparatus of claim 16 including a by-pass switching circuit operatively connected across said electronic switching means and adapted for operative connection to the alerting means, said circuit comprising (a) a relay means including a switch operatively connected across said electronic switching means and a grounded coil a voltage drop across which closes said relay means' switch, and (b) a normally-closed by-pass switch operatively connected to said relay means' grounded coil and adapted for operative connection to the alerting means, whereby after said by-pass switch has been operatively connected to said alerting means, the energized alerting means cannot be disarmed after actuation thereof has occurred unless said by-pass switch is opened.

24. The apparatus of claim 23 in combination with the alerting means, said alerting means being operatively connected across said circuit's relay means and by-pass switch.

25. The apparatus of claim 24 in which said alerting means is an alarm device.

26. The apparatus of claim 23 including a signal means for perceiving operation of said apparatus, said signal means operatively connected to said one of a first set of contact means in said relay mechanisms, and means in the operative connection between said signal means and said one of a first set of contact means for preventing a voltage return to the said coil in said relay mechanism.

27. The apparatus of claim 26 including a capacitor circuit coupled to the grounded coil of said first of said relay means, whereby said signal means is caused to be actuated for a definite period of time, and means in the operative connection between said grounded coil of said first of said relay means and the open switch in said second of said relay units for preventing discharge from said capacitor circuit and which would impress a voltage drop across said coil in said relay mechanism.

28. The apparatus of claim 26 in combination with the alerting means, said alerting means being operatively connected to said electronic switching means.

29. The apparatus of claim 28 in which said alerting means is an alarm device.

* * * * *